(12) United States Patent
Wahlberg

(10) Patent No.: US 11,879,209 B2
(45) Date of Patent: Jan. 23, 2024

(54) FEEDING ARRANGEMENT

(71) Applicant: VALMET AB, Sundsvall (SE)

(72) Inventor: Robert Wahlberg, Sundsvall (SE)

(73) Assignee: VALMET AB, Sundsvall (SE)

( * ) Notice: Subject to any disclaimer, the term of this patent is extended or adjusted under 35 U.S.C. 154(b) by 495 days.

(21) Appl. No.: 17/268,680

(22) PCT Filed: Jul. 10, 2019

(86) PCT No.: PCT/SE2019/050685
§ 371 (c)(1),
(2) Date: Feb. 16, 2021

(87) PCT Pub. No.: WO2020/050757
PCT Pub. Date: Mar. 12, 2020

(65) Prior Publication Data
US 2021/0189647 A1    Jun. 24, 2021

(30) Foreign Application Priority Data

Sep. 5, 2018  (SE) .................... 1851053-7

(51) Int. Cl.
| | |
|---|---|
| *D21C 7/06* | (2006.01) |
| *B30B 9/12* | (2006.01) |
| *B65G 33/22* | (2006.01) |
| *D21B 1/26* | (2006.01) |
| *D21C 7/12* | (2006.01) |

(52) U.S. Cl.
CPC ............ *D21C 7/06* (2013.01); *B30B 9/127* (2013.01); *B65G 33/22* (2013.01); *D21B 1/26* (2013.01); *D21C 7/12* (2013.01); *B65G 2201/04* (2013.01)

(58) Field of Classification Search
CPC ........... B30B 9/127; B30B 9/12; B65G 33/22; B65G 33/01; D21B 1/26; D21C 7/06
USPC ........................................................ 162/246
See application file for complete search history.

(56) References Cited

U.S. PATENT DOCUMENTS

| | | | | |
|---|---|---|---|---|
| 5,795,438 A | * | 8/1998 | Stromberg ............... | D21C 7/06 162/241 |
| 2016/0145797 A1 | * | 5/2016 | McCanty ................. | D21C 3/00 162/243 |
| 2017/0089009 A1 | * | 3/2017 | Mellander .............. | B65G 33/18 |

FOREIGN PATENT DOCUMENTS

| | | | | |
|---|---|---|---|---|
| CA | 2650919 A1 | * | 7/2010 | ............ B65G 33/18 |
| CN | 207482755 U | | 6/2018 | |
| DE | 2728422 A1 | | 1/1979 | |
| WO | WO 2013/126007 A1 | | 8/2013 | |
| WO | WO 2015/178828 A1 | | 11/2015 | |

* cited by examiner

*Primary Examiner* — Anthony Calandra
(74) *Attorney, Agent, or Firm* — Foley & Lardner LLP

(57) ABSTRACT

A feeding arrangement comprising a transportation means (3) for transportation of material from a material supply to at least a first chute (7) and a second chute (8), a plug screw feeder (11) for feeding the material to the treatment stage. The plug screw feeder (11) is provided with a first inlet opening (12) connected to the first chute (7), which first chute (7) is provided between the transportation means (3) and the plug screw feeder (11). Further, the transportation means (3) comprises at least selectively openable first and second outlets (4, 5) arranged at different axial positions along the transportation means (2), which first outlet (4) is in connection with the first chute (7) and the second outlet (5) is in connection with the second chute (8).

13 Claims, 1 Drawing Sheet

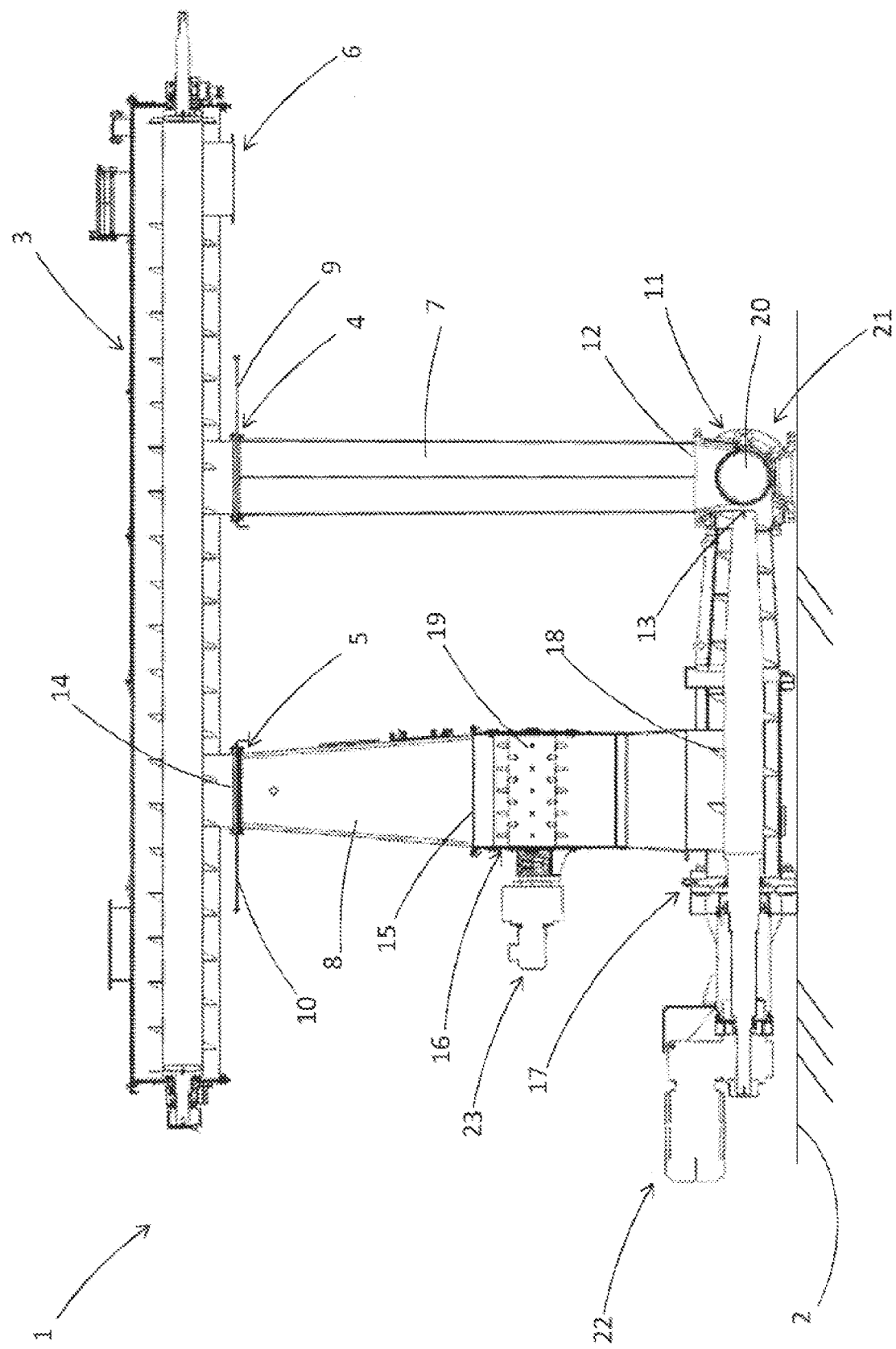

FEEDING ARRANGEMENT

TECHNICAL FIELD

The present invention relates generally to a feeding arrangement for feeding comminuted cellulose material to a treatment stage according to claim 1.

BACKGROUND ART

Feeding of cellulose material to be treated in a treatment stage, e.g. a treatment vessel, may be carried out in different ways and is dependent on a number of factors, and one of those factors is the characteristics of the material which is to be fed into the treatment vessel, e.g. a pressurized or liquid-filled reactor. In certain processes a plug screw feeder is used to feed the material into the treatment vessel. The plug screw feeder compresses the material before it is fed into the treatment vessel. The treatment vessel may be pressurized or liquid-filled. At feeding of the material into the treatment vessel, feeding of compressed material with a relatively high density prevents the pressure or the liquid within the treatment vessel to flow back this since the fed material is of high density which acts as plug and prevents back flow.

In prior art different feeding arrangements are used depending on the characteristics of the cellulose material which is to be processed in the treatment vessel. In the event the cellulose material is non-wood material such as annual fiber, straw etc. the non-wood material need to be compressed before entering the pressurized or liquid-filled treatment vessel. Without compression of the non-wood material its density is too low and will not prevent back flow when fed into the plug screw feeder. When feeding the non-wood material, the feeding arrangement may comprise a pin drum feeder which feeds the non-wood material to a force feed screw which compresses the non-wood material before it is fed into the treatment vessel. In the event the cellulose material is wood-based material such as e.g. wood chips etc. the wood-based material may be fed directly to the plug screw feeder and further to the treatment vessel. The reason to that the wood-based material may be directly fed from a transportation means into the plug screw feeder is that density of the inputted fed wood plant material is higher than the density of the inputted non-wood material.

A drawback with these type of feeding arrangements is that only one type of cellulose material may be processed within one certain kind of feeding arrangement. That is one separate feeding arrangement is used to process non-wood material, and one separate feeding arrangement is used to process wood plant material. Thus, if the processing of the cellulose material is to be changed from non-wood material to wood-based material a change to another separate feeding arrangement must be made. Thus, separate feeding arrangements and associated processing means must be in readiness for the different materials to be processed. With this configuration the drawback is that separate feeding arrangements for different processing arrangements must be provided if different kinds of cellulose material are to be processed. Thus, these separated feeding arrangements are both expensive to purchase and will take up a great deal of space which is not desirable.

SUMMARY OF INVENTION

An object of the present invention is to create one single feeding arrangement being able to process at least two different comminuted cellulose material, which cellulose materials have different material characteristics.

According to a first aspect of the invention, there is provided a feeding arrangement for feeding comminuted cellulose material to a treatment stage. The feeding arrangement comprises a transportation means for transportation of material from a material supply to at least a first chute and a second chute. A plug screw feeder for feeding the material to the treatment stage. Further, the plug screw feeder is provided with a first inlet opening connected to the first chute, which first chute is provided between the transportation means and the plug screw feeder. The second chute is provided between the transportation means and the plug screw feeder. Further, the plug screw feeder is provided with a second inlet opening in feeding communication with the second chute. Further, the transportation means is located above the plug screw feeder and the transportation means comprises at least selectively openable first and second outlets arranged at different axial positions along the transportation means. The first outlet is in connection with the first chute and the second outlet is in connection with the second chute. The advantage with at least two selectively openable outlets from the transportation means is that it is possible to use one single plug screw feeder which is able to receive materials from both feeding paths. Thus, the redirection of comminuted cellulose material into different feeding paths or chutes, allows processing of materials containing different characteristics by means of one single plug screw feeder.

In a preferred embodiment the first and second inlet openings of the plug screw feeder are located in different radial positions in relation to each other. This type of configuration allows feeding of two different comminuted cellulose material with different characteristics to be processed by means of one single feeding arrangement.

In a preferred embodiment the first and second inlet openings of the plug screw feeder are arranged in a perpendicular relationship to each other.

In a preferred embodiment the plug screw feeder comprises an outlet opening connected to a treatment vessel.

In a preferred embodiment the feeding arrangement may further comprise a pin drum feeder which is connected to the second chute.

In a preferred embodiment the feeding arrangement further comprise a force feed screw which may be connected to the pin drum feeder, and in turn the force feed screw is connected to the second inlet opening of the plug screw feeder.

In a preferred embodiment the second chute has a cross section with a width that increases from the area in the vicinity of the transportation means towards the pin drum feeder.

In a preferred embodiment the force feed screw is provided with a feed screw which force feed the material from the pin drum feeder to the plug screw.

In a preferred embodiment the material which is fed through the first chute is wood-based material and the material which is fed through the second chute is non-wood material.

In a preferred embodiment the plug screw feeder is driven by a first independent motor, the force feed screw is driven by a second independent motor, and the pin drum feeder is driven by a third independent motor, thus the first, second and third motors are connected to a control unit, which controls the individual speed of each motor.

In a preferred embodiment the control unit is arranged to control the selectively openable first, second and third outlets of the transportation means.

According to a second aspect of the invention of the present invention, a method for operation the feeding arrangement, comprising the steps:

controlling the selectively openable first, second and third outlets of the transportation means,
feeding the material from the material supply by means of the transportation means to the first chute and/or the second chute,
feeding the material from the first chute to the plug screw feeder,
feeding the material from the plug screw feeder to the treatment vessel,
controlling the speed of the motors by means of the control unit.

In a preferred embodiment of the method comprises the steps:

feeding the material from the second chute to the pin drum feeder,
handling of the material by means of the pin drum feeder,
feeding the material from the pin drum feeder to the plug screw feeder by means of the force feed screw.

BRIEF DESCRIPTION OF DRAWINGS

The invention is now described, by way of example, with reference to the accompanying drawings, in which:

FIG. 1 shows a feeding arrangement according to the invention.

DESCRIPTION OF EMBODIMENTS

In the description below, various directions may be given with reference to a feeding arrangement, standing upright on a ground surface. Examples of such directions can be up, down etc.

In this context, the term "comminuted cellulose material" should be construed broadly to incorporate wood-based material as well as non-wood materials. In short, the term non-wood material is used for all kinds of plants/plant parts containing material not being defined as wood. The particle dimension of the comminuted cellulose material may range in the interval of approximately 5-50 mm when feeding wood chips and in the case of non-wood material the length may lie in the range up to approximately 100-200 mm.

In the following, a detailed description of the feeding arrangement 1 according to the invention is given with reference to FIG. 1. The feeding arrangement 1 is a device for transporting comminuted cellulose material from a supply by means of transportation means 3 to a treatment stage.

The feeding arrangement 1 comprises a transportation means 3 for transportation of material from a material supply to at least a first and a second outlet 4, 5 located along the extension direction of the transportation means 3. Preferably, the excess material transported by the transportation means are transported to a third outlet 6, arranged at the end of the transportation means 3. The transportation means 3 may be any suitable transportation means, such as e.g. a conveyor belt, a feed worm, a screw conveyor etc.

The first and second outlets 4, 5 are arranged at different axial positions along the transportation means 3, which first outlet 4 is in connection with a first chute 7 and the second outlet 4 is in connection with a second chute 8. The first and second outlets 4, 5 are selectively openable and closable, independent of each other. Which one of the first and second outlets 4, 5 which is opened and closed, respectively is dependent on which type of comminuted cellulose material that is to be processed. In one embodiment the first and second outlets 4, 5 may be provided with guillotine devices 9, 10 which are opened/closed upon demand from a control unit.

The first chute 7 is placed between the transportation means 3 and a plug screw feeder 11. The transportation means 3 is provided above the first chute 7, and the plug screw feeder 11 is provided below the first chute 7. The first chute 7 is substantially vertically arranged between the transportation means 3 and the plug screw feeder 11, which feeds the material by means of a continuous movement to the treatment stage by means of a rotating feed screw. The first chute 7 has preferably a uniform cross section along its extension direction. The plug screw feeder 11 is provided with a first inlet opening 12 which is connected to the first chute 7. The first inlet opening 12 is provided on an upper substantial horizontal surface of the plug screw feeder 11. Preferably, wood-based material is supplied by means of the first chute 7 to the plug screw feeder 11. Wood-based material is gravity fed through the first chute 7 to the plug screw feeder 11, due to that wood has an already relatively high density. Thus, there is no need to compress the wood-based material before entering the plug screw feeder 11.

The second chute 8 is provided between the second outlet 5 of the transportation means 3 and the plug screw feeder 11. Further, the plug screw feeder 11 is provided with a second inlet opening 13 in feeding communication with the second chute 8. The transportation means 3 is provided above the second chute 8, and the plug screw feeder 11 is provided in the region below the second chute 8.

The second chute 8 is substantially vertically arranged, which second chute 8 handles the material on its way to the treatment stage by means of the plug screw feeder 11. Preferably, non-wood material is supplied through the second chute 8. The second chute 8 is connected in a first end 14 to the second outlet 5 of the transportation means 3 and may in a second end 15 be connected to a pin drum feeder 16. Further, a force feed screw 17 may be in connection with the pin drum feeder 16. The force feed screw 17 feeds and compresses the comminuted cellulose material before it enters the plug screw feeder 11. Further, the pin drum feeder 16 may be in connection with the second inlet opening 13 of the plug screw feeder 11. The second inlet opening 13 of the plug screw feeder 11 is provided on a substantial vertical side surface of the plug screw feeder 11. Within the feeding arrangement 1, the utilization of the pin drum feeder 16 is optional. In the case the pin drum feeder 16 is omitted the second chute 8 is in direct feeding connection with the force feed screw 17, which feeds and compresses the comminuted cellulose material before entering the plug screw feeder 11.

Preferably, the second chute 8 has preferably a cross section with a width that increases from the area in the vicinity of the transportation means 3 towards the pin drum feeder 16. The configuration of the second chute 8 with an increasing cross section towards pin drum feeder 16 reduces the risk of that non-wood material get caught within the second chute 8 on its way from the transportation means 3 to the pin drum feeder 16. Preferably, non-wood material is guided of the second chute 8 on its way to the plug screw feeder 11.

The first and second inlet openings 12, 13 of the plug screw feeder 11 are located in different radial positions in relation to each other. This to allow one single plug screw feeder 11 to receive communicated cellulose material with different characteristics from two different chutes 7, 8, which chutes are independently provided in relation to each other. In one embodiment the first and second inlet openings 12, 13 of the plug screw feeder 11 are arranged in a perpendicular relationship to each other. The first inlet opening 12 is provided on an upper side of the plug screw feeder 11 to be able to receive gravity fed wood-based materials and the second inlet opening 13 of the plug screw feeder 11 is provided on a side surface of the plug screw feeder 11. Further, the plug screw feeder comprises an outlet opening 20 which is connected to the treatment vessel.

Further, the feeding arrangement 1 comprises the pin drum feeder 16 which is connected to the second chute 8, and in turn the pin drum feeder 16 is connected to a force feed screw 17 which is connected to the second inlet opening 13 of the plug screw feeder 11. The force feed screw 17 is provided with a feed screw 18 which force feed the material from the pin drum feeder 16 to the plug screw feeder 11.

The plug screw feeder 11 is designed to continuously transport comminuted cellulose material by means of a feed screw 18 into the pressurized or liquid-filled treatment vessel. The plug screw 18 performs a volumetric compression of the material, which compressed material then is force-fed into the treatment vessel through the outlet 20. The plug screw feeder 11 is provided with the first and second inlet openings 12, 13, a tapered compression zone and the outlet opening 20. The extension direction of the first and second inlet openings 12, 13 are preferably arranged in the same extension directions as the extension direction of the feed screw 18 within the plug screw feeder 11. The feed screw 18 within the plug screw feeder 11 is driven by a motor. The plug screw feeder 11 compresses the comminuted cellulose material to remove pitch, water and remaining air and without shortening the fiber length. In the plug screw feeder 11 a tight plug is continuously formed of the cellulose material which seals against e.g. the pressure within the treatment vessel.

The pin drum feeder 16 ensures a smooth and reliable feeding of the cellulose material to the plug screw feeder 11, which feeds the cellulose material into the treatment vessel. The pin drum feeder 16 is provided with speed-controlled revolving drums 19 with sturdy conical pins. The pin drum feeder 16 distributes the cellulose material in a controlled flow down to a force feed screw 17. The force feed screw 17 then feeds the cellulose material into the plug screw feeder 11. The force feed screw 17 forces the cellulose material into the second inlet opening 13 of the plug screw feeder 11, thus providing an increased and uniform packing density in the second inlet opening 13. The fully packed second inlet 13 also prevents back flow from the plug screw feeder 11. Within the treatment vessel there is a steam pressure of approximately 13 bars, and to avoid leakage of e.g. steam from the treatment vessel when the plug screw feeder 11 feeds the comminuted cellulose material into it, the density of the non-wood material or the wood-based material needs to be in the interval of 130-150 kg/m$^3$.

The pin drum feeder 16 also controls the feed rate of cellulose material to the plug screw. The plug screw feeder 11 is driven by a first independent motor 21, the force feed screw 17 is driven by a second independent motor 22, and the pin drum feeder 16 is driven by a third independent motor 23, thus the first, second and third motors 21, 22, 23 are connected to the control unit, which controls the individual speed of each motor. Further, the control unit is arranged to control the selectively openable first, second and third outlets 4, 5, 6 of the transportation means 3. In the event the non-wood material is feed into the second chute 8, the pin drum feeder 16 and its associated motor determines the speed of the process as a master unit.

The operation of the feeding arrangement 1 will now be explained with reference to FIG. 1. The comminuted cellulose material is transported from a material supply by means of the transporting means 3. Depending on the characteristics of the material, i.e. non-wood material or wood-based material, the appropriate first or second outlet 4, 5 is opened, and the non-used first or second outlet 4, 5 remains closed.

In the case wood-based material is transported, the first outlet 4 to the first chute 7 is opened and the second outlet 5 to the second chute 8 remains closed. Thus, the wood-based material is feed by means of the force of gravity through the first chute 7 to the plug screw feeder 11. Within the plug screw feeder 11, the wood-based material is compressed before it is feed to the treatment vessel.

In the case non-wood material is transported, the first outlet 4 connected to the first chute 7 is closed and the second outlet 5 to the second chute 8 is opened. Thus, the non-wood material is feed by means of the force of gravity through the second chute 8 to the pin drum feeder 16. The pin drum feeder 16 distributes the non-wood material in a controlled flow down to the force feed screw 17. The force feed screw 17 then feeds the non-wood material into the plug screw feeder 11 by means of the feed screw 18 and further to the treatment vessel. The first, second and third motors 21, 22, 23, the speed of the transportation means, the opening or closing of the first, second and third outlets 4, 5, 6 are connected to a control unit, which controls the individual items.

Independent of which of the first and second outlets 4, 5 of the transportation means 3 is opened, the surplus of the transported material is discharged through the third outlet 6 to a collecting bin.

The invention claimed is:

1. A feeding arrangement for feeding comminuted cellulose material to a treatment stage, the feeding arrangement comprising:
   a transportation means for transportation of the material from a material supply to a first chute and a second chute and
   a plug screw feeder configured to feed the material to the treatment stage, wherein:
   the plug screw feeder comprises a first inlet opening connected to the first chute, which first chute is provided between the transportation means and the plug screw feeder,
   the second chute is provided between the transportation means and the plug screw feeder,
   the plug screw feeder comprises a second inlet opening in feeding communication with the second chute,
   the transportation means is located above the plug screw feeder, and
   the transportation means comprises selectively openable first and second outlets arranged at different axial positions along the transportation means,
   the first outlet is in connection with the first chute, and the second outlet is in connection with the second chute,
   the first chute is substantially vertically arranged and configured to allow the material to be gravity fed through the first chute, and
   the second chute is in feeding connection with a force feed screw configured to feed and compress the material before it enters the plug screw feeder.

2. The feeding arrangement according to claim 1, wherein the first and second inlet openings of the plug screw feeder are located in different radial positions in relation to each other.

3. The feeding arrangement according to claim 1, wherein the first and second inlet openings of the plug screw feeder are arranged in a perpendicular relationship to each other.

4. The feeding arrangement according to claim 1, wherein the plug screw feeder comprises an outlet opening connected to a treatment vessel.

5. The feeding arrangement according to claim 1, wherein the feeding arrangement comprises a pin drum feeder connected to the second chute.

6. The feeding arrangement according to claim 5, wherein the force feed screw is configured to receive the material from the the pin drum feeder and configured to provide the material to the second inlet opening of the plug screw feeder.

7. The feeding arrangement according to claim 5, wherein the second chute has a cross section with a width that increases from an area in a vicinity of the transportation means towards the pin drum feeder.

8. The feeding arrangement according to claim 1, wherein the force feed screw comprises a feed screw configured to force feed the material from a pin drum feeder to the plug screw feeder.

9. The feeding arrangement according to claim 1, wherein the transportation means comprises a third outlet arranged at the end of the transportation means.

10. The feeding arrangement according to claim 5, wherein:
the plug screw feeder is driven by a first independent motor, the force feed screw is driven by a second independent motor, and the pin drum feeder is driven by a third independent motor, and
the first, second and third independent motors are connected to a control unit configured to control an individual speed of each motor.

11. The feeding arrangement according to claim 10, wherein the control unit is arranged to control the selectively openable first and second outlets of the transportation means.

12. A method for operating the feeding arrangement according to claim 11, the method comprising steps of:
controlling the selectively openable first and second of the transportation means using the control unit;
feeding the material from the material supply, using the transportation means, to the first chute or the second chute;
feeding the material from the first chute or the second chute to the plug screw feeder;
feeding the material from the plug screw feeder to a treatment vessel; and
controlling the speed of the first independent motor, the second independent motor, and the third independent motor using the control unit.

13. The method for feeding the feeding arrangement according to claim 12, comprising steps of:
feeding the material from the second chute to a pin drum feeder;
handling of the material using the pin drum feeder; and
feeding the material from the pin drum feeder to the plug screw feeder using the force feed screw.

* * * * *